United States Patent
Despins et al.

(10) Patent No.: US 9,032,184 B2
(45) Date of Patent: May 12, 2015

(54) IMPLEMENTING DRIVE LIST MODE FOR READS AND WRITES FOR HARD DISK DRIVES

(75) Inventors: Thomas James Despins, Oronoco, MN (US); Christopher Scott Dudley, Oronoco, MN (US); Christopher Scott Taylor, Rochester, MN (US); Shad Henry Thorstenson, Rochester, MN (US); Anthony Edwin Welter, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 214 days.

(21) Appl. No.: 13/619,526

(22) Filed: Sep. 14, 2012

(65) Prior Publication Data

US 2014/0082274 A1 Mar. 20, 2014

(51) Int. Cl.
*G06F 12/08* (2006.01)
*G06F 13/12* (2006.01)

(52) U.S. Cl.
CPC .......... *G06F 12/0868* (2013.01); *G06F 13/124* (2013.01)

(58) Field of Classification Search
CPC . G06F 12/0218; G06F 12/0868; G06F 13/12; G06F 13/124
USPC ........................... 711/111, 112, 217, E12.019
See application file for complete search history.

(56) References Cited

U.S. PATENT DOCUMENTS

| | | | |
|---|---|---|---|
| 5,872,673 A | 2/1999 | Purkett | |
| 6,029,226 A * | 2/2000 | Ellis et al. | 711/100 |
| 6,603,621 B1 | 8/2003 | Kigami et al. | |
| 7,240,135 B2 | 7/2007 | Bai et al. | |
| 7,626,805 B2 | 12/2009 | Hall et al. | |
| 8,468,319 B1 * | 6/2013 | Satran | 711/168 |
| 2001/0028524 A1 * | 10/2001 | Hoskins | 360/55 |
| 2007/0083708 A1 * | 4/2007 | Zhou | 711/114 |
| 2007/0136607 A1 * | 6/2007 | Launchbury et al. | 713/190 |
| 2007/0180155 A1 * | 8/2007 | Irish | 710/5 |
| 2008/0187782 A1 * | 8/2008 | Lee et al. | 428/814 |
| 2009/0150607 A1 * | 6/2009 | Krantz et al. | 711/113 |
| 2010/0161936 A1 * | 6/2010 | Royer et al. | 711/209 |
| 2011/0216774 A1 | 9/2011 | Nevil et al. | |
| 2012/0030421 A1 * | 2/2012 | Chang et al. | 711/108 |
| 2012/0159066 A1 * | 6/2012 | Rabinovici et al. | 711/113 |

OTHER PUBLICATIONS

"DIG: Rapid Characterization of Modern Hard Disk Drive and Its Performance Implication" by J. Gim et al., Storage Network Architecture and Parallel I/Os, 2008. SNAPI'08. Fifth IEEE International Workshop, Sep. 22, 2008.
"Discrete-Time Exact and Approximate Dynamic Inversion for Settle Performance World Congress, vol. # 17 | Part# 1" By Grian Rigney et al., Proceedings of the 17th IFAC World Congress, 2008.

* cited by examiner

*Primary Examiner* — Hal Schnee
(74) *Attorney, Agent, or Firm* — Joan Pennington (57) ABSTRACT

A method, apparatus and a data storage device are provided for implementing drive list mode for read and write transfers on a recordable surface of a storage device. Drive List mode provides a queue in a linked list to chain together multiple independent transfers on a single track. The multiple drive independent transfers include at least one of sequential transfers, near-sequential transfers, and random transfers on the single track. A drive list mode transfer of multiple independent transfers on the single track is enabled in one disk revolution, and requiring a single hardware setup for the drive list mode transfer.

17 Claims, 6 Drawing Sheets

220

128

| 0 | | 1 | | 2 | | 3 | |

| OPERATION 222 | 0 | 1 | 2 | 3 |
|---|---|---|---|---|
| Drive LBA (DIBA) 224 | 0-2 | 10-15 | 25-28 | 30 |
| Host LBA (DLBA) 226 | 5000-5002 | 1000-1015 | 1500-1503 | 10 |
| AES Key Range 228 | 5 | 2 | 7 | 4 |
| Page Count 230 | 1000 | 2000 | 3000 | 4000 |

FIG. 1

DRIVE LIST ENTRY TABLE LAYOUT FOR DRIVE
LIST ENTRIES STORED IN SRAM 130
200

| KEYID POINTER 206 | | LBA x 204 | | ADDRESS 202 |
|---|---|---|---|---|
| | | DLBA x (DRIVE LIST ENTRY x FOR LBA CRC SEED AND ENCRYPTION TWEAK KEY OF FIRST SECTOR OF DRIVE LIST ENTRY x | | 4001 0000 |
| | | DILBA x ( FOR LBA CRC SEED AND FORMATTER OF OF FIRST SECTOR OF DRIVE LIST ENTRY x | | 4001 0008 |
| KEYID x | DXFER LEN x | DSPAGE x (PAGE IN BUFFER) | DSSEC x (SECTION IN BUFFER) | 4001 0010 |
| L | NEXT x | DSPGCNT x STARTING PAGE COUNT TO LOAD INTO SG PAGE COUNT REGISTER WHEN SLOT IS USED BY SG. | | 4001 0018 |

| OPERATION 222 | 0 | 1 | 2 | 3 |
|---|---|---|---|---|
| Drive LBA (DIBA) 224 | 0–2 | 10–15 | 25–28 | 30 |
| Host LBA (DLBA) 226 | 5000–5002 | 1000–1015 | 1500–1503 | 10 |
| AES Key Range 228 | 5 | 2 | 7 | 4 |
| Page Count 230 | 1000 | 2000 | 3000 | 4000 |

PRIOR ART

IMPLEMENTING DRIVE LIST MODE FOR READS AND WRITES FOR HARD DISK DRIVES

FIELD OF THE INVENTION

The present invention relates generally to the data storage field, and more particularly, relates to a method, apparatus and a data storage device for implementing drive list mode for read and write transfers for hard disk drives.

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

The hard disk drives (HDDs) can include Shingled Disk Drives (SDDs) to achieve high track density. A Shingled Disk Drive (SDD) is a hard disk drive recording magnetic patterns of data on a writable disk surface in overlapping circular tracks using shingled magnetic recording (SMR), also referred to as a SMR drive.

Figure 4:
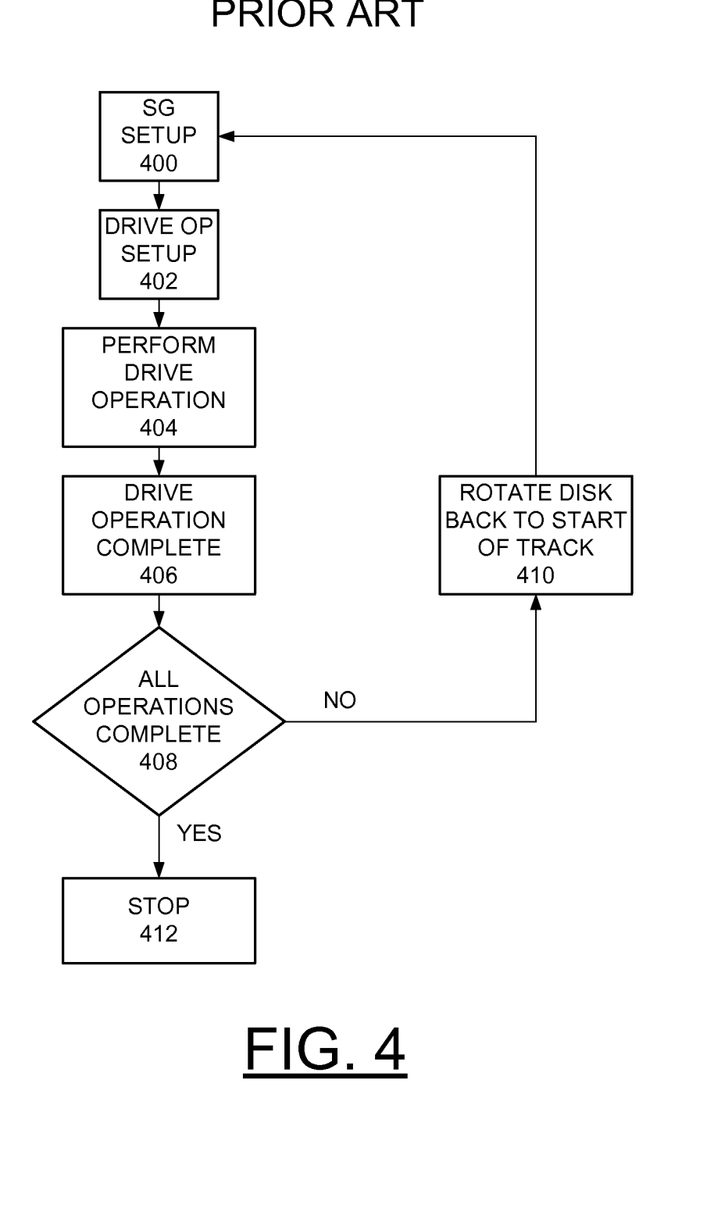
FIG. 4 is a flow chart illustrating example prior art operations for read and write transfers where each separate transfer requires one rotation of the disk.

FIG. 4. provides a flow chart illustrating example prior art operations for performing a series of reads or writes that are not contiguous on a single track of an HDD. Typically performing a series of reads or writes that are not contiguous on a single track of an HDD requires the set up of each contiguous section of the data as an independent transfer including a segment handler (SG) setup at block 400, followed by a drive operation (OP) setup at block 402. The drive operation is performed at block 404 and the completed at block 406. Each separate transfer for drive operations identified at decision block 408 requires one rotation of the disk, rotating disk back to a start of track at block 410. When all operations are completed at decision block 408, the process stops at block 412. The total time to read or write all of the non-contiguous chunks of data increases with the number of independent pieces needed to be transferred because a revolution of the disk is needed for each independent transfer. In addition, the hardware must be set up for each independent transfer. The resulting time makes it difficult to meet some performance targets.

A need exists for an enhanced effective and efficient mechanism to implement enhanced read and write transfers on a recordable surface of a storage device.

SUMMARY OF EMBODIMENTS OF THE INVENTION

Aspects of the present invention are to provide a method, apparatus and data storage device for implementing drive list mode for read and write transfers on a recordable surface of a storage device. Other important aspects of the present invention are to provide such method, apparatus and data storage device substantially without negative effect and to overcome some of the disadvantages of prior art arrangements.

In brief, a method, apparatus and a data storage device are provided for implementing drive list mode for read and write transfers on a recordable surface of a storage device. Drive List mode provides a queue in a linked list to chain together multiple independent transfers on a single track. The multiple drive independent transfers include at least one of sequential transfers, near-sequential transfers, and random transfers on the single track. A drive list mode transfer of multiple independent transfers on the single track is enabled in one disk revolution, and requiring a single hardware setup for the drive list mode transfer.

BRIEF DESCRIPTION OF THE DRAWINGS

The present invention together with the above aspects, features, and advantages may best be understood from the following detailed description of the embodiments of the invention illustrated in the drawings, wherein.

DETAILED DESCRIPTION OF THE EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

In accordance with features of the embodiments of the invention, a method, apparatus and a data storage device are provided for implementing a drive list mode for read and write transfers on a recordable surface of a storage device.

Figure 1:
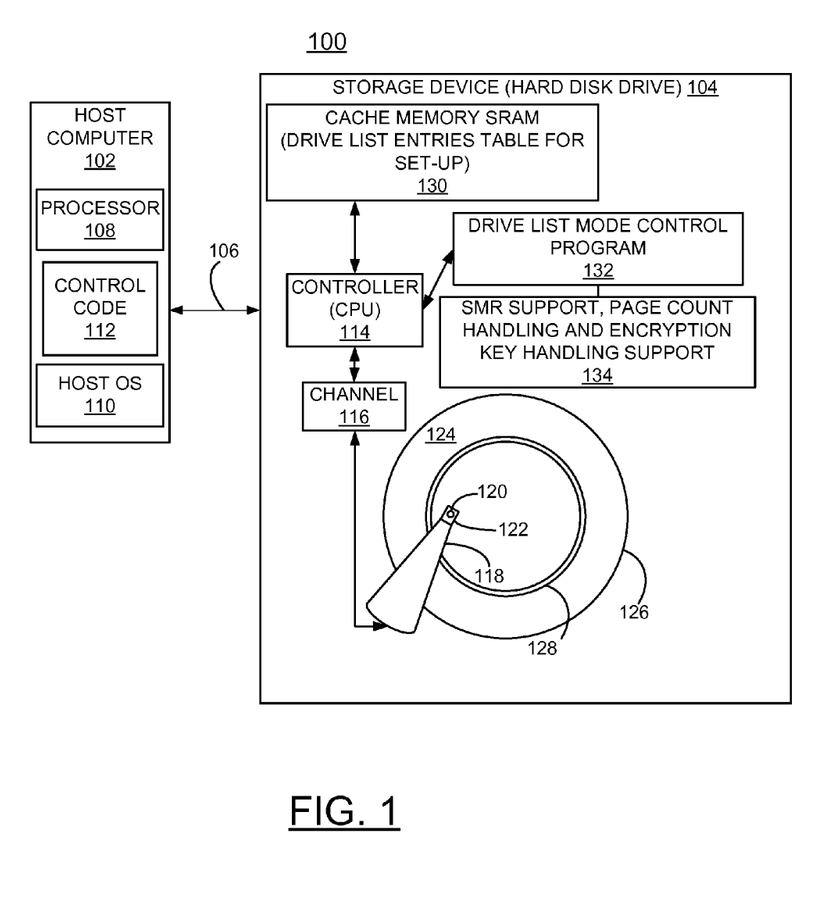
FIG. 1 is a block diagram representation illustrating a system for implementing drive list mode for read and write transfers on a recordable surface of a storage device in accordance with an embodiment of the invention.

Having reference now to the drawings, in FIG. 1, there is shown an example system generally designated by the reference character 100 for implementing drive list mode for read and write transfers on a recordable surface of a storage device in accordance with an embodiment of the invention. System 100 includes a host computer 102, a storage device 104, such as a hard disk drive 104, and an interface 106 between the host computer 102 and the storage device 104.

As shown in FIG. 1, host computer 102 includes a processor 108, a host operating system 110, and control code 112. The storage device or hard disk drive 104 includes a controller 114 coupled to a data channel 116. The storage device or hard disk drive 104 includes an arm 118 carrying a read/write head including a read element 120, and a write element 122.

In operation, host operating system 110 in host computer 102 sends commands to hard disk drive 104. In response to the commands, hard disk drive 104 performs requested functions such as reading data, writing data, erasing data, and the like, on disk surface 124. The read element 120 reads magnetic patterns of data on the recordable or writable surface 124 of the disk 126. The write element 122 writes magnetic patterns of data on the recordable or writable surface 124 of the disk 126 in a selected circular track 128. The storage device or hard disk drive 104 optionally uses perpendicular magnetic recording (PMR) or shingled perpendicular magnetic recording (SMR).

According to some embodiments of the present invention, controller circuit 114 causes read element 120 to read magnetic patterns of data or write element 122 to record magnetic patterns of data on a writable surface of disk 122 in circular physical tracks 128. System 100 includes a cache memory 130, for example, implemented with a static random access memory (SRAM) 130. System 100 includes Drive List Mode control program 132 is coupled to the controller 114 in accordance with an embodiment of the invention. SMR support, page count handling and encryption key handling support functions 134 are coupled to the Drive List Mode control program 132. SMR support functions 134 provide separate host and disk logical block address (LBA) by variable amounts. Page count handling and encryption key handling support functions 134 enable dynamic page count handling and on-the-fly encryption key handling.

In accordance with features of the embodiments of the invention, controller 114 uses Drive List Mode control program 132 providing a queue in a linked list in SRAM 130 enabling firmware to chain together multiple drive independent transfers that all occur within or on a single track 128. The independent transfers include read and write transfers including sequential transfers or near-sequential transfers, and/or random transfers on the single track 128. A transfer of multiple independent transfers on the single physical track 128 in one disk revolution is enabled with the controller 114 using Drive List Mode 132, requiring only one hardware setup for the Drive List Mode transfer. Controller 114 traverses through the list automatically updating hardware for each independent transfer as it is processed in the Drive List Mode transfer of multiple independent transfers on the single physical track 128.

In accordance with features of the embodiments of the invention, a linked list of independent transfers on a single track is stored in a linked list table in the internal SRAM 130. The controller hardware 114 traverses this list as the data is transferred for that list entry. As the list is traversed, relevant parts of the data path are automatically loaded with the required data for that part of the data path on the single track 128. Drive List mode chains together multiple independent transfers on the single track, and works for example with both 512B and 4 kB formats for the independent transfers.

Controller 114 can include various implementations, for example, fabricated with one or multiple integrated circuit dies. A digital video recorder (DVR), a set-top-box (STB), or various other computer system types are specific implementation of a host computer 102. While control code 112 is shown in the host computer 102, and the controller 114 is shown in the hard disk drive 104, the control code 112 may reside in any suitable location, such as the hard disk drive 104 separate from host computer 102 and controller circuit 114 may reside in any suitable location, separate from hard disk drive 104, for example, in the host computer 102, and the like.

System 100 including the host computer 102 and the storage device or hard disk drive 104 is shown in simplified form sufficient for understanding the present invention. The illustrated host computer 102 together with the storage device or hard disk drive 104 is not intended to imply architectural or functional limitations. The present invention can be used with various hardware implementations and systems and various other internal hardware devices.

Figure 2A:
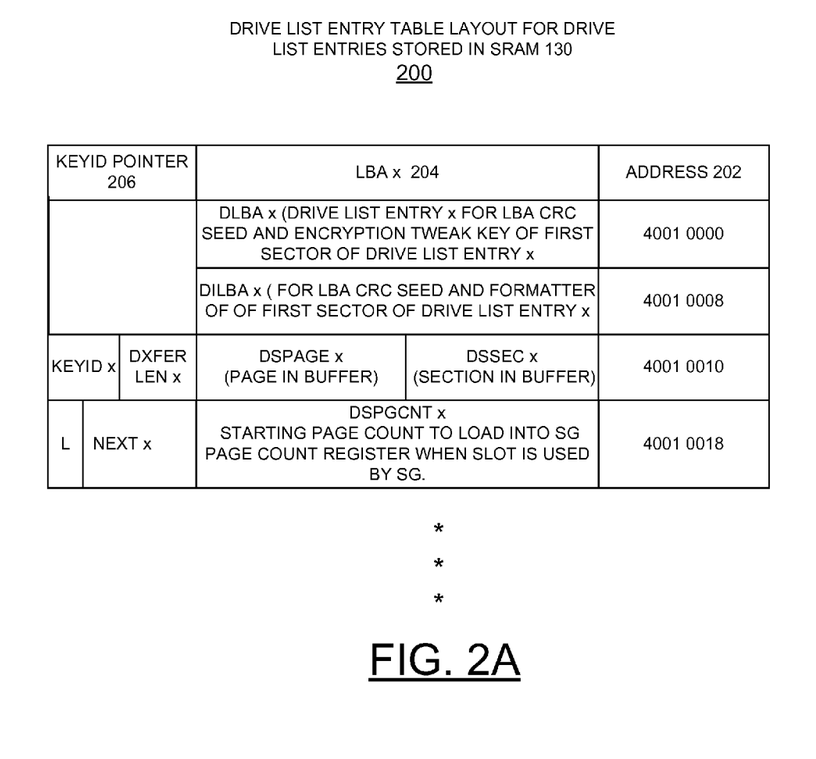
FIG. 2A illustrates an example drive list entry table layout for drive list entries stored in a static random access memory (SRAM) of the system of FIG. 1 in accordance with an embodiment of the invention.

Referring to FIG. 2A, there is shown an example drive list mode table layout generally designated by the reference character 200 for drive list entries stored in the SRAM 130 for implementing drive list mode for read and write transfers on a single data track 128 of the recordable surface 124 of a storage device 104 in accordance with an embodiment of the invention. Table drive list 200 include multiple fields of addresses 202, logical block address (LBA) information 204, and key ID pointer information 206 for each of entries. An example single drive list entry is shown in the table drive list 200 of FIG. 2A with the illustrated field names described as follows.

Each of multiple drive list entries include multiple LBA information fields 204 as illustrated in the drive list entries table 200, for example described as follows:

| | |
|---|---|
| DLBA x | A 36b LBA used for LBA CRC Seed and Encryption Tweak Key of the first Sector of Drive List entry x. |
| DILBA x | A 36b LBA used for LBA ECCC Seed and Formatter of the first Sector of Drive List entry x. |
| DSSEC x | A 12b section where the first Sector of Drive List entry x resides in the Buffer. |
| DSSEC x | A 16b page where the first Sector of Drive List entry x resides in the Buffer. |
| DSPGCNT x | A 36b starting page count to be loaded into the segment handler (SG) page count register when the slot is used by the SG. |

Each of multiple drive list entries include multiple KEYID pointer information fields 206 as illustrated in the drive list entries table 200 as follows:

| | |
|---|---|
| KEYID x | A valid 14b KEYID pointer for the SG to use to fetch the matching set of keys for encryption. This KEYID x is also used to seed the ECC logic |
| DXFERLEN x | A 22b number of sectors to transfer for Drive List entry x. |
| L | A 1b flag to indicate last entry in list. |
| NEXT x | A 7b pointer for a next Drive List entry x. |

In accordance with features of the embodiments of the invention, the segment handler (SG) is a partition of logic in controller 114 responsible for controlling and sending out LBAs and indications of when a transfer should be stopped due to basic things like end of a transfer, lack of data or when certain LBAs are reached, such as the last LBA on a track. The Page Counts and Key IDs are kept track of by the SG to determine when a transfer should start or stop and for distributing information needed for a particular part of a transfer. The SG pre-fetches entries from the Drive List to maintain data flow.

In accordance with features of the embodiments of the invention, an encryption key is used to encrypt data being written, for example, using an Advanced Encryption Standard (AES), an encryption algorithm used for encrypted hard disk drives, which can be divided into separate LBA ranges with each have a different key.

Figure 2B:
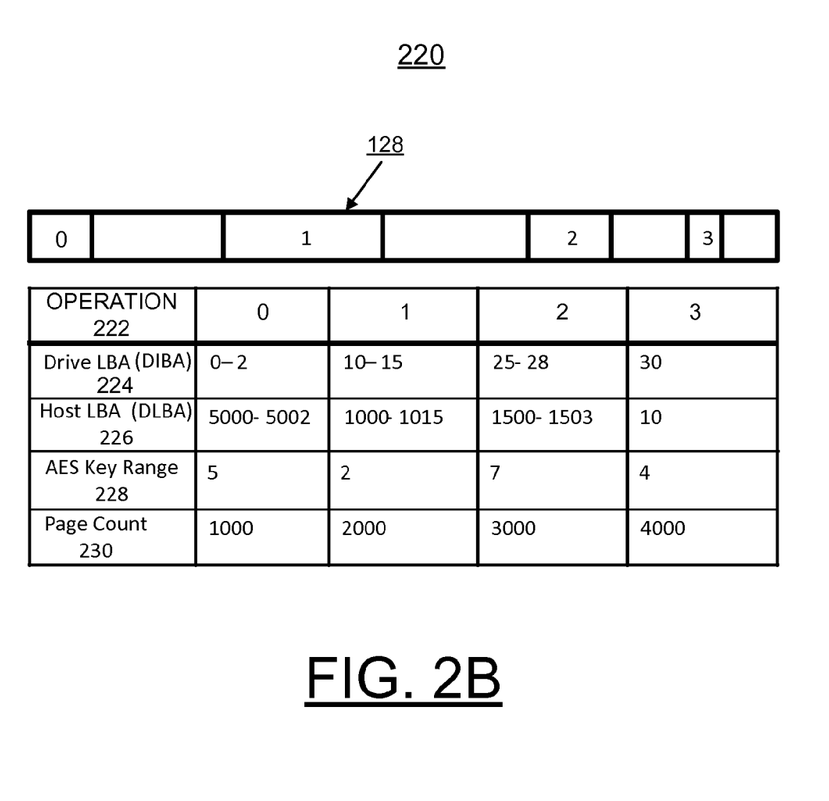
FIG. 2B illustrates an example of four drive list entries in accordance with an embodiment of the invention.

Referring now to FIG. 2B, four example drive list entries generally designated by the reference character 220 are illustrated with a single physical track 128 including four operations 220, 0-4 in accordance with an embodiment of the invention. As shown, respective example Drive LBA (DIBA) 224 includes 0-2, 10-15, 25-28 and 30 for the respective example four operations 220, 0-4. Respective example Host LBA (DLBA) 226 include 5000-5002, 1000-1015, 1500-1503 and 10 for the respective example four operations 220, 0-4. Typically there is no correlation between the Host LBA (DLBA) 226 and physical location on a track 128. Respective example AES Key Range 228 includes 5, 2, 7, and 4 for the respective example four operations 220, 0-4. As shown, the AES Key Range 228 can change on every list entry. Respective example Page Count 230 includes 1000, 2000, 3000, and 4000 for the respective example four operations 220, 0-4.

In accordance with features of the embodiments of the invention, the Drive List Mode provides a queue in a linked list in SRAM 130 enabling firmware to chain together multiple drive independent transfers that all occur within or on a single track 128.

Figure 3:
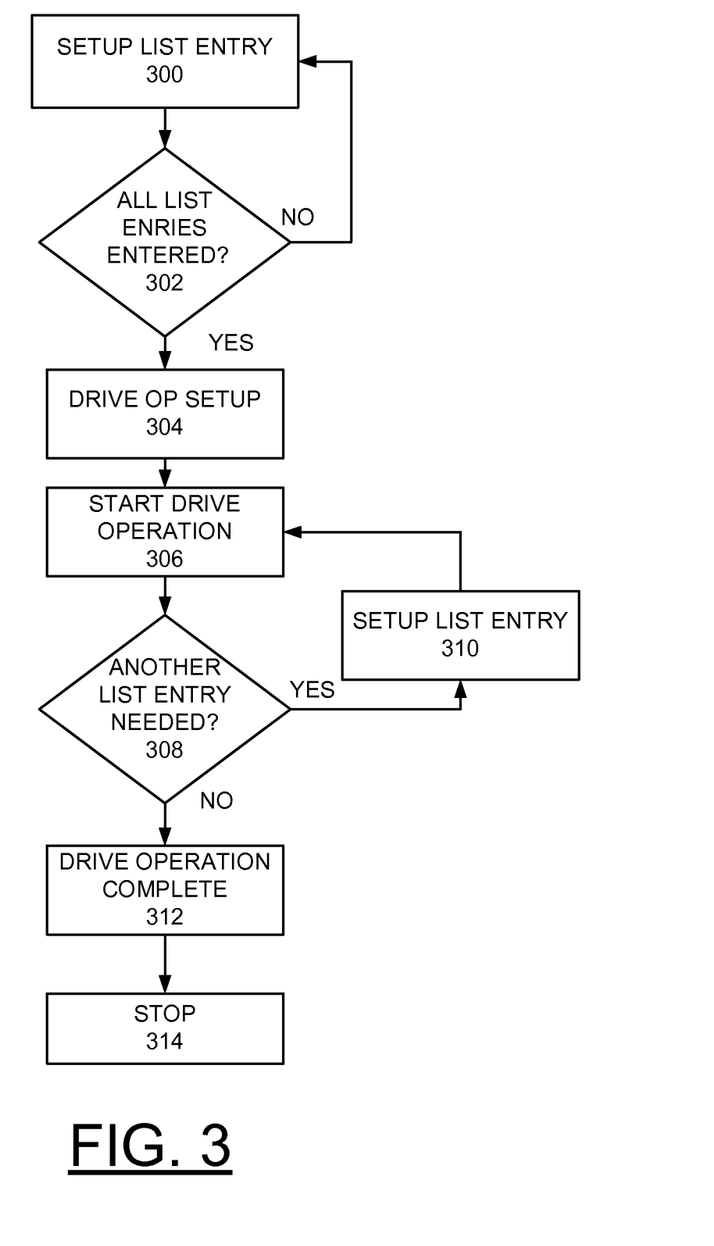
FIG. 3 is a flow chart illustrating example operations of the system of FIG. 1 for implementing drive list mode for read and write transfers on a recordable surface in accordance with embodiments of the invention.

Referring now to FIG. 3, there are shown example operations of the Drive List Mode by the system 100 of FIG. 1 in accordance with embodiments of the invention. In FIG. 3, example operations, for example, performed by controller 114, start as indicated at a block 300 with setup of a list entry. Checking whether all list entries for multiple independent transfers on the single physical track 128 have been entered as indicated at a decision block 302. If not, a next list entry is setup at block 300 until all list entries have been entered.

When all list entries have been entered, a drive operation is setup as indicated at a block 304. The Drive List Mode transfer of multiple independent transfers on the single physical track 128 in one disk revolution requires only one hardware setup at block 304 for the Drive List Mode transfer. The drive operation starts as indicated at a block 306. Checking whether another list entry is needed is performed as indicated at a decision block 308. As indicated at a block 310, a list entry is setup. List entries can be dynamically attached at block 310 provided the Drive LBA (DIBA) is still on the track and larger than the last list entry. When the drive operation is completed at a block 312, the process stops at block 314.

Figure 5:
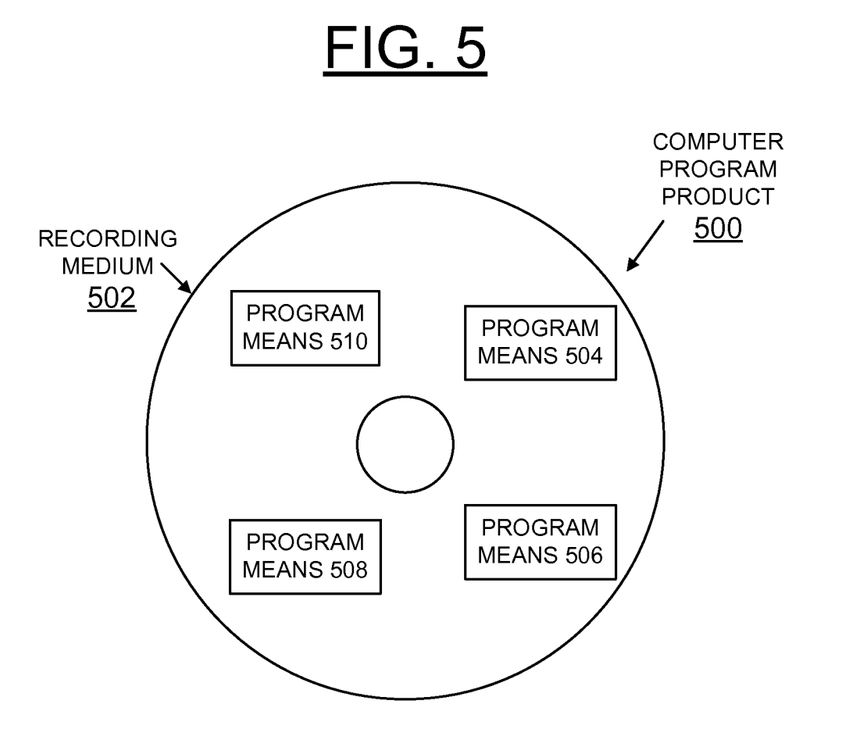
FIG. 5 is a block diagram illustrating a computer program product in accordance with embodiments of the invention.

Referring now to FIG. 5, an article of manufacture or a computer program product 500 of the invention is illustrated. The computer program product 500 includes a computer readable recording medium 502, such as, a floppy disk, a high capacity read only memory in the form of an optically read compact disk or CD-ROM, a tape, or another similar computer program product. Computer readable recording medium 502 stores program means or control code 504, 506, 508, 510 on the medium 502 for carrying out the methods for implementing drive list mode for read and write transfers of the embodiments of the invention in the system 100 of FIG. 1.

A sequence of program instructions or a logical assembly of one or more interrelated modules defined by the recorded program means or control code 504, 506, 508, 510, direct the system 100 for implementing drive list mode of the embodiments of the invention.

While the present invention has been described with reference to the details of the embodiments of the invention shown in the drawing, these details are not intended to limit the scope of the invention as claimed in the appended claims.

What is claimed is:

1. A method for implementing drive list mode for read and write transfers on a recordable surface of a storage device comprising:
   providing a controller;
   providing an independent transfer queue in a linked list chaining together multiple independent transfers on a single physical track, said independent transfers including read and write transfers of at least one of sequential transfers, near-sequential transfers, and random transfers;
   storing said linked list in an internal static random access memory (SRAM) in the storage device;
   enabling a drive list mode transfer of the multiple independent transfers on the single physical track in one disk revolution, requiring a single hardware setup for the drive list mode transfer; and
   said controller using the drive list mode linked list, traversing said linked list automatically updating hardware for each independent transfer as data is transferred for each linked list entry in the drive list mode transfer of multiple independent transfers on the single physical track; and
   said controller checking for another linked list entry being needed for a received command and dynamically attaching the another linked list entry responsive to a drive logical block address (LBA) of the received command being on the single physical track and the drive LBA being larger than a last entry in the linked list.

2. The method as recited in claim 1 wherein the storage device includes a hard disk drive using shingled perpendicular magnetic recording (SMR) or perpendicular magnetic recording (PMR).

3. The method as recited in claim 1 wherein providing an independent transfer queue in a linked list chaining together multiple independent transfers on a single physical track includes storing a linked list entry for each of the multiple independent transfers on the single physical track.

4. The method as recited in claim 3 wherein storing each said linked list entry includes storing logical block address (LBA) information for the respective independent transfers on the single physical track.

5. The method as recited in claim 3 wherein storing each said linked list entry includes storing transfer length information for the respective independent transfers on the single physical track.

6. The method as recited in claim 3 wherein storing each said linked list entry includes storing pointer information for the respective independent transfers on the single physical track.

7. The method as recited in claim 1 wherein storing each said linked list entry includes storing encryption key pointer information for the respective independent transfers on the single physical track.

8. The method as recited in claim 1 wherein storing each said linked list entry includes storing page count information for the respective independent transfers on the single physical track.

9. An apparatus for implementing drive list mode for read and write transfers on a recordable surface of a storage device comprising:
   the recordable surface of the storage device including a plurality of physical data tracks;
   a controller identifying a drive list mode, said controller providing an independent transfer queue in a linked list chaining together multiple independent transfers on a single one of said physical data tracks, said independent transfers including read and write transfers of at least one of sequential transfers, near-sequential transfers, and random transfers, and storing said linked list in an internal static random access memory (SRAM) in the storage device;
   said controller enabling a drive list mode transfer of the multiple independent transfers on the single physical track in one disk revolution, requiring a single hardware setup for the drive list mode transfer; and
   said controller using the drive list mode linked list, traversing said linked list automatically updating hardware for each independent transfer as data is transferred for each linked list entry in the drive list mode transfer of multiple independent transfers on the single physical track; and
   said controller checking for another linked list entry being needed for a received command and dynamically attaching the another linked list entry responsive to a drive logical block address (LBA) of the received command being on the single physical track and the drive LBA being larger than a last entry in the linked list.

10. The apparatus as recited in claim 9, further including control code stored on a non-transitory computer readable medium, and wherein said controller uses said control code for implementing the drive list mode.

11. The apparatus as recited in claim 9, further including said controller storing a linked list entry for each of the multiple independent transfers on the single physical track.

12. The apparatus as recited in claim 11, further including said controller storing encryption key pointer information for each respective independent transfer on the single physical track.

13. The apparatus as recited in claim 11, further including said controller storing pointer information for a next respective independent transfer on the single physical track.

14. The apparatus as recited in claim 11, further including said controller storing logical block address (LBA) information and transfer length information for each respective independent transfer on the single physical track.

15. A data storage device comprising:
    at least one disk, said disk including a recordable surface;
    said recordable surface including a plurality of physical data tracks;
    a controller identifying a drive list mode, said controller providing an independent transfer queue in a linked list chaining together multiple independent transfers on a single one of said physical data tracks, said independent transfers including read and write transfers of at least one of sequential transfers, near-sequential transfers, and random transfers, and storing said linked list in an internal static random access memory (SRAM) in the storage device;
    said controller enabling a drive list mode transfer of the multiple independent transfers on the single physical track in one disk revolution, requiring a single hardware setup for the drive list mode transfer; and
    said controller using the drive list mode linked list, traversing said linked list automatically updating hardware for each independent transfer as data is transferred for each linked list entry in the drive list mode transfer of multiple independent transfers on the single physical track; and
    said controller checking for another linked list entry being needed for a received command and dynamically attaching the another linked list entry responsive to a drive logical block address (LBA) of the received command being on the single physical track and the drive LBA being larger than a last entry in the linked list.

16. The data storage device as recited in claim 15, wherein the data storage device includes a hard disk drive using shingled perpendicular magnetic recording (SMR) or perpendicular magnetic recording (PMR).

17. The data storage device as recited in claim 15, wherein said controller providing an independent transfer queue in a linked list chaining together multiple independent transfers on a single one of said physical data tracks includes said controller storing a linked list entry for each of the multiple independent transfers on the single physical track.

* * * * *